United States Patent [19]
Vogel

[11] Patent Number: 5,388,194
[45] Date of Patent: Feb. 7, 1995

[54] SYSTEM FOR ALTERING ELEMENTS OF A TEXT FILE TO MARK DOCUMENTS

[76] Inventor: Peter Vogel, 28 Adeline Street, Faulcconbridge NSW 2776, Australia

[21] Appl. No.: 548,904

[22] Filed: Jul. 24, 1990

[30] Foreign Application Priority Data

Feb. 11, 1988 [AU] Australia .................. PI6705

[51] Int. Cl.⁶ .............................................. G06F 15/62
[52] U.S. Cl. ................................... 395/145; 395/117; 395/148
[58] Field of Search ........................ 395/144–149, 395/108, 114–117; 364/DIG. 2; 360/77.02, 77.08, 135; 371/10; 235/468

[56] References Cited

U.S. PATENT DOCUMENTS

| 3,654,611 | 4/1972 | Bluethman et al. | 395/117 |
| 4,434,487 | 2/1984 | Rubinson et al. | 371/10 |
| 4,480,179 | 10/1984 | Schaefer et al. | 235/473 |
| 4,577,289 | 3/1986 | Comerford et al. | 364/900 M |
| 4,605,846 | 8/1986 | Duret et al. | 235/468 |
| 4,608,618 | 8/1986 | Sturtevant-Stuart | 360/135 |

FOREIGN PATENT DOCUMENTS

| 3662884 | 6/1985 | Australia | G06K 9/00 |
| 8505713 | 12/1985 | WIPO | G07S 7/08 |

Primary Examiner—Almis Jankus
Attorney, Agent, or Firm—Cushman, Darby & Cushman

[57] ABSTRACT

A system for generating documents. A text file representing a document is encoded using a marking code. This marking code is encoded into the document by altering elements of the contents of the text file. Preferably the spaces between words are altered to be short and long spaces. The marked version therefore indicates, in an encoded fashion, the marking code that is applied.

15 Claims, 6 Drawing Sheets

Fig. 1

This is an example of how a piece of text is marked. The spaces between words are varied according to a correspondence between bits of a ten-bit word which encodes alpha-numeric data into the text. By producing unique copies of confidential documents with the names of recipients encoded, recipients are deterred from leaking the document, for example by photocopying, because they fear that the leaked copy will be found and traced back to them.

The marking is repeated throughout the text, so that it can be decoded even if only a small fragment of the document is recovered.

Fig. 2

This is*an*example of how*a piece*of*text is*marked. The*spaces*between words*are varied*according to a*correspondence between*bits of a*ten-bit word which*encodes*alpha-numeric data into*the text. By producing*unique*copies of*confidential documents with the*names of*recipients encoded, recipients*are deterred*from leaking the*document, for example*by photocopying, because they*fear*that the leaked copy*will be*found*and traced*back to them.
 The*marking is*repeated*throughout the*text, so that it*can be*decoded*even*if only*a small*fragment of the*document is recovered.

Fig. 3

\* indicates long space

This is an example of how a piece of text is marked.

The spaces between words are varied according to a correspondence between bits of a ten-bit word which encodes alpha-numeric data into the text. By producing unique copies of confidential documents with the names of recipients encoded, recipients are deterred from leaking the document, for example by photocopying, because they fear that the leaked copy will be found and traced back to them.

The marking is repeated throughout the text, so that
it can be decoded even if only a small fragment of the document is recovered.

SYSTEM FOR ALTERING ELEMENTS OF A TEXT FILE TO MARK DOCUMENTS

TECHNICAL FIELD

The present invention relates to methods of, and apparatus for, generating documents which, as well as presenting the usual alpha-numeric text information, contain a distinctive marking. More particularly, the marking scheme of the invention can convey identifying information which, in the event of a document coming into the possession of an unauthorised person, allows a particular copy of a document to be traced to its source.

BACKGROUND ART

A common problem faced by authors of confidential documents is the difficulty of preventing unauthorised persons from gaining access to them. A related problem is breach of copyright of printed texts. These problems have become particularly acute with the commonplace availability of photocopiers as it is a simple matter for a person legitimately possessing a certain document to copy it and pass it on to other, perhaps unauthorised, persons. To date, prevention of such transgressions has been mainly by physical restriction of availability, for example by denying access to all but a trustworthy few, and relying on punitive measures to prevent breach of confidence. As a further deterrent confidential documents are sometimes stamped with the words "SECRET" or "CONFIDENTIAL". Such techniques have little effect and efforts have been made to mark documents in such a way that each copy bears a distinctive feature so that in the event of "leaking" the source of the leak can be identified. One such technique involves subtly changing the text of each copy distributed and recording the details of changes made in the case of each recipient. This technique is cumbersome, requires undesirable alteration of the text, and relies on recovery of the whole or a large part of the text to be effective as a means of identifying the source. Other marking schemes utilise a pattern of special markings which must cover the whole page area if the possibility of erasure is to be avoided.

The present invention is directed to providing an improved document marking scheme which uniquely identifies each of a potentially large number of copies of a document and cannot be removed from the text of the document. A further novel and useful feature of the invention is the ability to convey within the marking textual information, such as the name of the intended recipient of each copy. Furthermore the marking scheme of the invention does not significantly detract from the visual quality of the document, and the marking is maintained in spite of photocopying, enlarging or reducing. The invention can be realised by a suitable arrangement of conventional digital data processing components. Other advantages and objects of this invention will be more fully appreciated from the description of the invention which follows.

DISCLOSURE OF INVENTION

According to one aspect of the invention there is provided a document marking method comprising the steps of inputting a file representing a document, altering certain elements of the contents of said file in such a way as to mark the document by altering the format or visual presentation of the document, said alteration being performed according to an algorithm accepting as an input identifying data to be encoded into the marking of the document, and outputting the processed file.

According to another aspect of the invention the marking method is achieved by varying the spacing between words of the text of the document in such a way that the sequence of variations corresponds to predetermined sequences representing alphanumeric characters.

According to yet another aspect of the invention there is provided a method of generating multiple uniquely-marked documents, employing the steps of the previous paragraphs repeatedly, using different identifying data each time.

The invention also consists in a method of decoding the marking encoded into a document using the above methods, comprising the steps of examining the spacing between successive words of a document, classifying said spaces as long or short, and matching the resulting sequence of long and short spaces with predetermined sequences representing alpha-numeric characters.

The invention also consists in data processing apparatus arranged to perform the marking methods described herein.

BRIEF DESCRIPTION OF THE DRAWINGS

The foregoing and other objects, features, extensions, and advantages of the invention will be apparent from the following description of some exemplary embodiments of the invention, as illustrated in the accompanying drawings in which.

MODES FOR CARRYING OUT THE INVENTION

Figure 1:
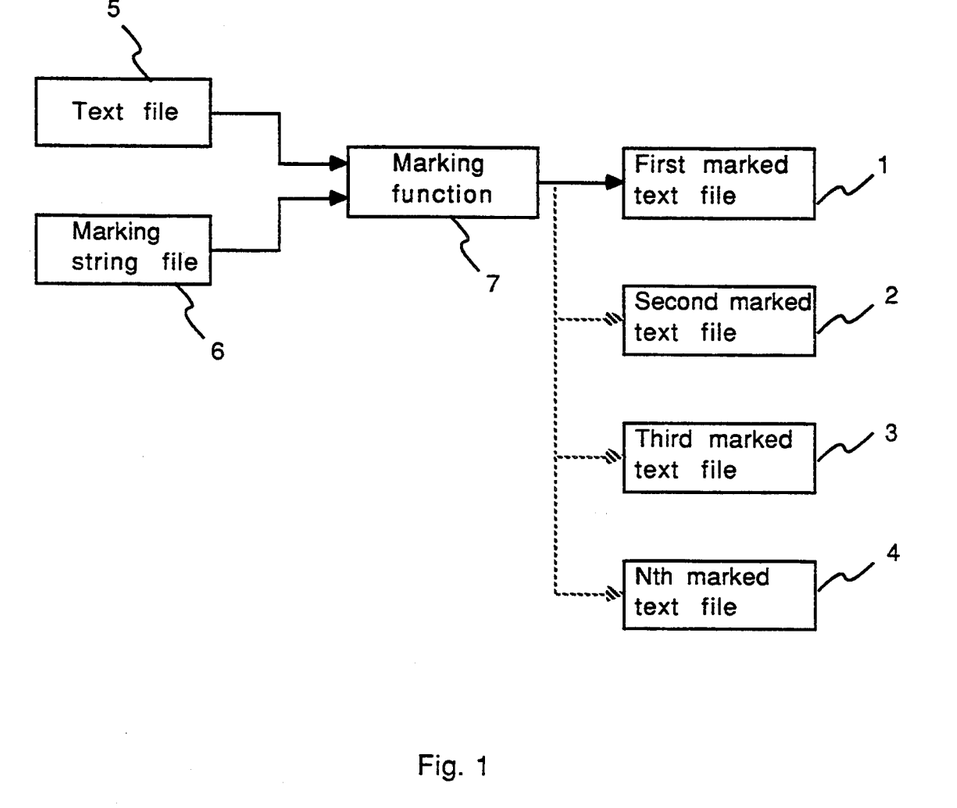
FIG. 1 is a schematic representation of a multiple document generating scheme according to the invention.

A text processing system for practice of the invention will now be described, by way of example only, in which a programmed digital computer is used to perform word-processing functions as well as the document marking function of the invention. This embodiment is useful for producing multiple copies of a document, each carrying a distinctive marking within the formatting of the text. For convenience, in this embodiment the marking codes correspond to alpha-numeric strings, such as persons' names, although this is not an essential characteristic of the invention. Referring to FIG. 1, a schematic representation of this multiple-document producing scheme is shown. Text file 5 is a digital representation of the document to be marked. Marking string file 6 is a set of data representing a table of alpha-numeric strings, each designating a recipient of the document. These files can reside in the memory of the computer or on a storage medium or can be received serially from another source and are created using well-known text-entry techniques, typically by typing on a keyboard. Marking function 7 is a set of programme instructions which when executed by the computer causes the text file to be processed as follows:

a. The first marking string is read from marking string file 6 b. Each character of the string is converted to a 10 bit marking pattern according to table 1 below.

c. A first marked text file 1 is created as an output file d. Each successive data byte of the text file 5 is read and tested to see whether the byte represents a space character. If not, the byte is written to the output file.

e. If the byte does represent a space character, the most significant bit of the 10 bit marking pattern is tested. If this bit is clear, the space character is written to the output file. If this bit is set, then a character representing a long space is written to the output file instead of the standard space character.

f. Steps d and e are repeated, for each successive byte of text file 5, and the next most significant bit of the 10 bit marking pattern is tested when a space is found.

g. When the last bit of the 10 bit marking pattern has been used, the process continues with the next 10 bits corresponding to the next byte of the marking string.

h. When the end of the marking string is reached, the marking string is repeated so that the text is marked repetitively throughout.

i. When the end of text file 5 is reached, a second marked text file 2 is created as output, and the process repeated using the second marking string.

This process is repeated for each marking string in marking string file 6, generating a set of files equal to the number of such strings.

For convenience, each marking string can consist of the name of a recipient of a copy of the document, with the result that when each marked file is printed, a set of documents each uniquely marked with the name of the intended recipient is available for distribution.

It is of course possible to direct the output of marking function 7 directly to a printer, so that the marked text files are not required, or the files can be stored temporarily prior to printing, or permanently on disk or other medium.

Marking function 7 in this embodiment of the invention uses a 10 bit marking code, where each bit defines the length of a corresponding space in the marked document. The codes corresponding to each alpha-numeric character have been selected to minimise the occurrence of long series of long or short spaces, so that the undesirable degradation of the appearance of the marked document is minimised.

The marking code corresponding to each character is shown in the following table (table 1), in which S represents a Short space, L represents a Long space.

TABLE 1

TABLE OF CHARACTER CODES

| SLSLSLSLSL | A | SSSLSLSLSL | 0 |
| SLSLSLSLLS | B | SSSLSLSLLS | 1 |
| SLSLSLLSSL | C | SSSLSLLSSL | 2 |
| SLSLSLLSLS | D | SSSLSLLSLS | 3 |
| SLSLLSSLSL | E | SSSLLSSLSL | 4 |
| SLSLLSSLLS | F | SSSLLSSLLS | 5 |
| SLSLLSLSSL | G | SSSLLSLSSL | 6 |
| SLSLLSLSLS | H | SSSLLSLSLS | 7 |
| SLLSSLSLSL | I | LLLSSLSLSL | 8 |
| SLLSSLSLLS | J | LLLSSLSLLS | 9 |
| SLLSSLLSSL | K | LLLSSLLSSL | # |

TABLE 1-continued

TABLE OF CHARACTER CODES

| SLLSSLLSLS | L | LLLSLSLSLS | SPACE |
| SLLSLSSLSL | M | | |
| SLLSLSSLLS | N | | |
| SLLSLSLSSL | O | | |
| SLLSLSLSLS | P | | |
| LSSLSLSLSL | Q | | |
| LSSLSLSLLS | R | | |
| LSSLSLLSSL | S | | |
| LSSLSLLSLS | T | | |
| LSSLLSSLSL | U | | |
| LSSLLSSLLS | V | | |
| LSSLLSLSSL | W | | |
| LSSLLSLSLS | X | | |
| LSLSSLSLSL | Y | | |
| LSLSSLSLLS | Z | | |
| LSLSSLLSSL | * | | |
| LSLSSLLSLS | + | | |
| LSLSLSSLSL | , | | |
| LSLSLSSLLS | - | | |
| LSLSLSLSSL | . | | |
| LSLSLSLSLS | / | | |

As can be seen from table 1, the marking codes for most characters have been chosen to ensure a maximum of two consecutive long or short spaces, except that the characters 0–9, # and space begin with three long spaces or three short spaces. This scheme allows the beginning of the characters starting with three long spaces or three short spaces to be located unambiguously even if the starting position of the coding is not known, for example when only a fragment of the document has been recovered. For this reason it is desirable that marking strings include at least one space or numeric character.

It is another feature of this embodiment that spaces following punctuation are ignored by the marking function, this being desirable to avoid ambiguity arising from multiple spaces commonly used after punctuation.

Figure 2:
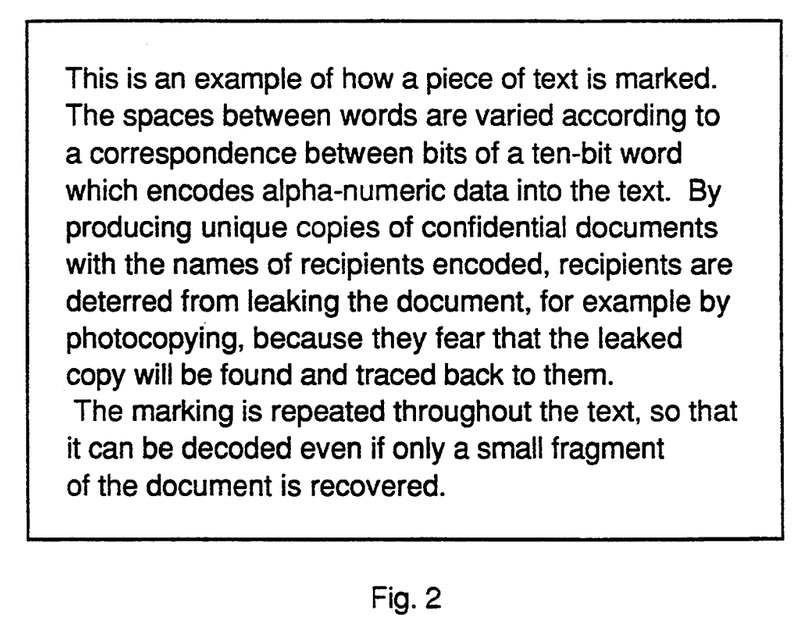
FIG. 2 is an illustration of an original piece of text.

This encoding scheme will be appreciated fully by reference to the following example in which the name "J Smith" is encoded into a document, shown in its original form in FIG. 2. The marking codes (as per Table 1) corresponding to the characters to be encoded are:

| J | SLLSSLSLLS |
| SPACE | LLLSLSLSLS |
| S | LSSLSLLSSL |
| M | SLLSLSSLSL |
| I | SLLSSLSLSL |
| T | LSSLSLLSLS |
| H | SLSLLSLSLS |
| SPACE | LLLSLSLSLS |
| J | SLLSSLSLLS |
| SPACE | LLLSLSLSLS |
| S | LSSLSLLSSL |
| M | SLLSLSSLSL |
| I | SLLSSLSLSL |
| T | LSSLSLLSLS |
| H | SLSLLSLSLS |
| (repeat for entire document). | |

Figure 3:
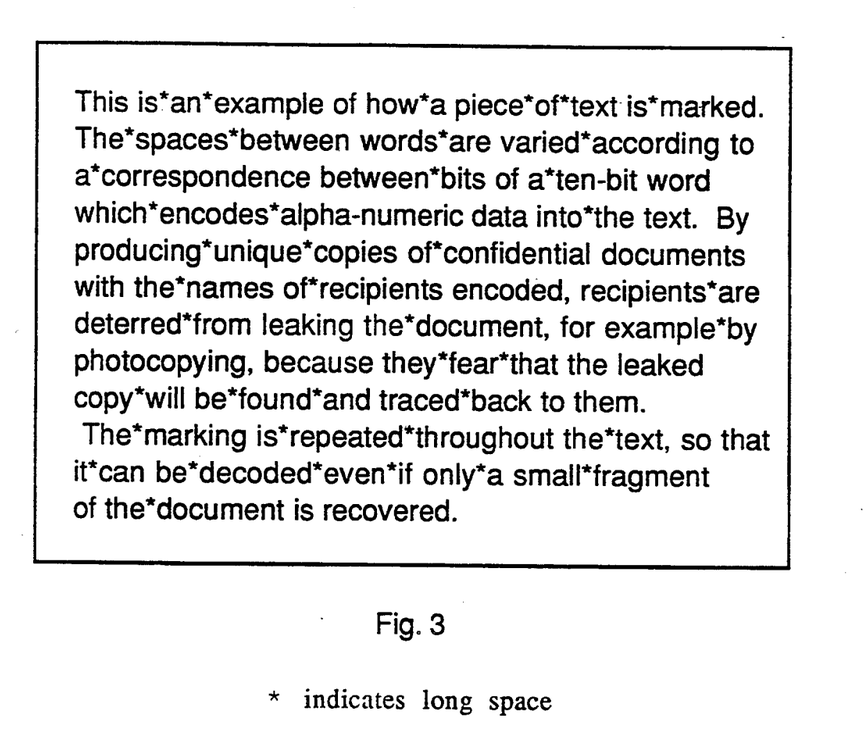
FIG. 3 is an illustration of a marked piece of text where asterisks indicate position of long spaces.
Figure 4:
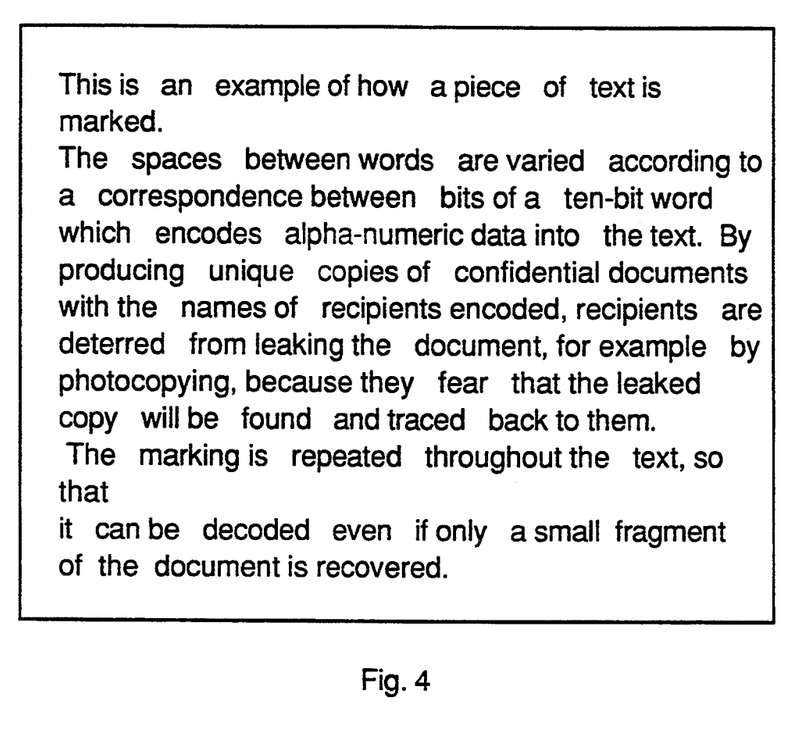
FIG. 4 is an illustration of a marked piece of text.

Applying this sequence of long and short spaces to a document yields a marked document as illustrated in FIG. 3, in which for clarity the asterisks indicate the positions of long spaces. The marked document is illustrated in FIG. 4.

Figure 5:
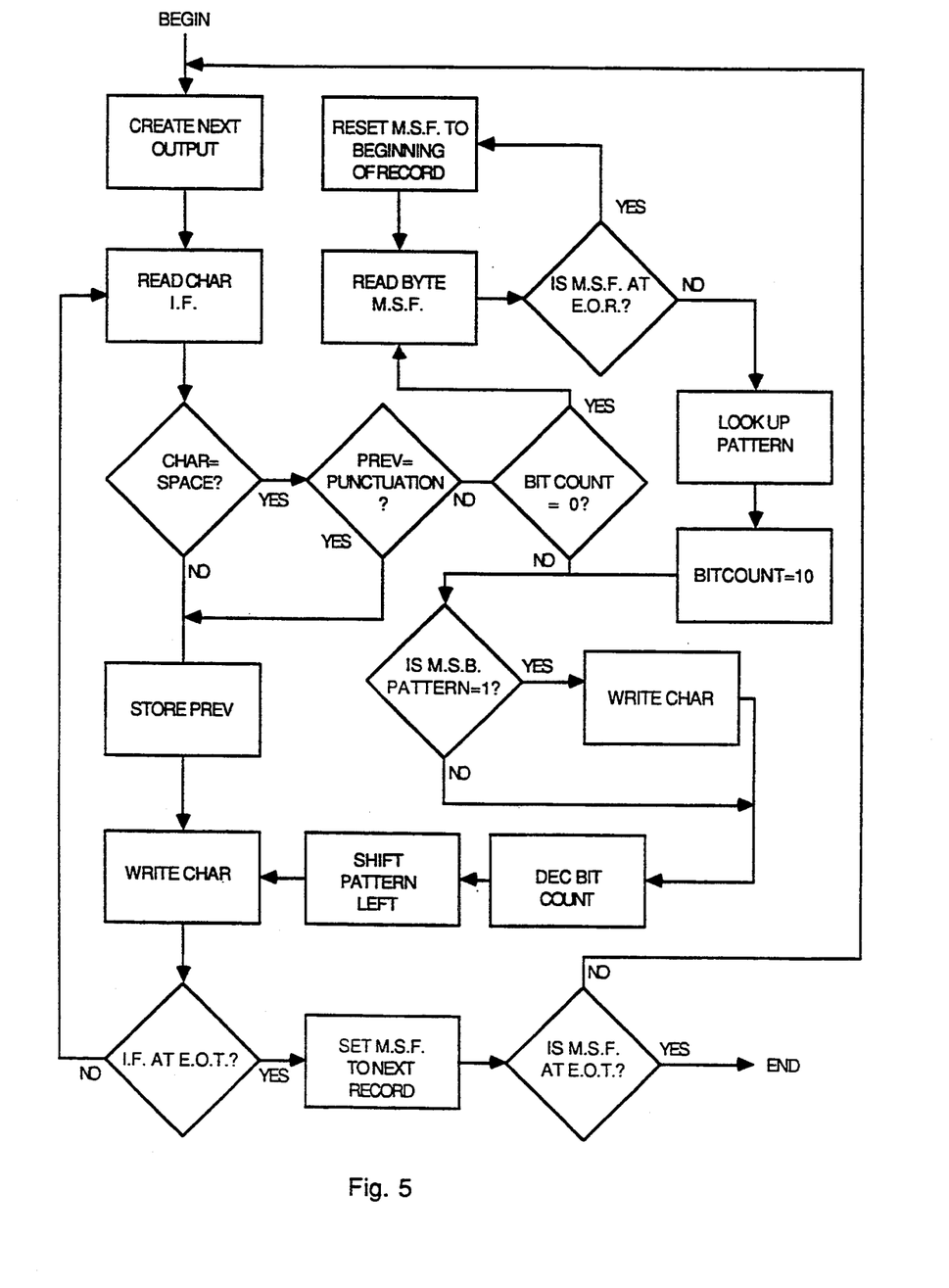
FIG. 5 is a flow diagram of the marking scheme used by an embodiment of the invention.

Operation of this embodiment of the invention will be understood fully by referring to the flow diagram of FIG. 5, in which the following abbreviations are used:

| I.F. | Input file |
|---|---|
| M.S.F. | Marking string file |
| E.O.R. | End of record |
| CHAR | Current character |
| PREV | Previous character |
| E.O.T. | End of text |
| PATTERN | 10 bit marking code pattern |
| BIT COUNT | Number of bits of PATTERN remaining to be used |
| DEC | Decrement |
| M.S.B. | Most significant bit |

Referring to FIG. 5, the process begins with the creation of the first output file. The first character is then read from the input file, and a test performed to determine whether the character read (CHAR) is the space character. If not, CHAR is written to the output file, CHAR is stored in a temporary location PREV, and a test is performed to see if the input file is at end of text. If not, the next character is read from the input file, and this process is repeated until a space character is encountered. When a space is encountered, PREV is tested to see whether the previous character was a punctuation character. If it was, the space is ignored. If not, a test is performed to see if BIT COUNT has reached zero, indicating that the end of the 10 bit marking code pattern has been reached. If not, the most significant bit of PATTERN is then tested, and if it is set (=1) a long space is required to be written to the output. In this embodiment, the long space is generated by using two consecutive space characters. This is achieved by writing the space (CHAR) to the output before returning to the main loop which writes it a second time. If the M.S.B. of PATTERN is not set, this extra write is not performed. The BIT COUNT is then decremented and the PATTERN shifted one bit to the left, in preparation for the next iteration. If, on encountering a space in the input file, the test BIT COUNT=0 is true, the next byte of the marking string file is read. If the marking string file is at the end of a record, the file is reset to the beginning of the same record, so that the marking string will be repeated throughout the pass of the input file. If it is not at the end of the record, the byte read from the marking string file is used to obtain a 10 bit marking pattern using a lookup table containing the data of Table 1, and BITCOUNT is reset to 10. When the test "I.F. AT E.O.T.?" returns true, the M.S.F. is set to the beginning of the next record, so that the next marking string will be used to mark the next file generated. A test is then performed to see if the M.S.F. is at E.O.T. A true result indicates that all required marked copies have been generated, in which case the process ends. If M.S.F. is not at E.O.T., another output is created, and the process repeats, generating an output file with the markings dictated by the next marking string of the M.S.F.

The marking of a particular document can be decoded manually, by observing the pattern of long and short spaces in the document and looking up the corresponding character codes as per Table 1. Alternatively, the source of a marked document can be identified by optically comparing the document with a set of copies made prior to circulating the document and identifying the one which matches. For identification, the copies should be labelled with the name of the recipient. For better security, it may be desired not to keep copies of the circulated documents, but to generate a new marked set for comparison purposes should the need for identification arise. Visual comparison can be aided by producing a transparency of the document which can be used to overlay the copy to be compared.

If desired, the decoding process can be automated, using a document scanner to input the document to be decoded to a computer which can then decode the marking, for example by ascertaining the spacing between words.

In some embodiments of the invention, certain additional features are provided for the purpose of streamlining the production of multiple marked documents. One such feature is additional software which provides the ability to command the computer to automatically use a recipient list (marking string file of the above-described embodiment) as a source of names to be inserted into a prescribed merge field of a document. This is useful for automatically annotating each marked copy with an identifying message. For example, it may be desired to print the message "THIS DOCUMENT IS MARKED AND UNIQUE TO J. SMITH" at the head of each version. In this case, the name (J. SMITH) would take the form of a merge field in the original document, the name being automatically inserted in the output text as part of the marking process of the invention.

Figure 6:
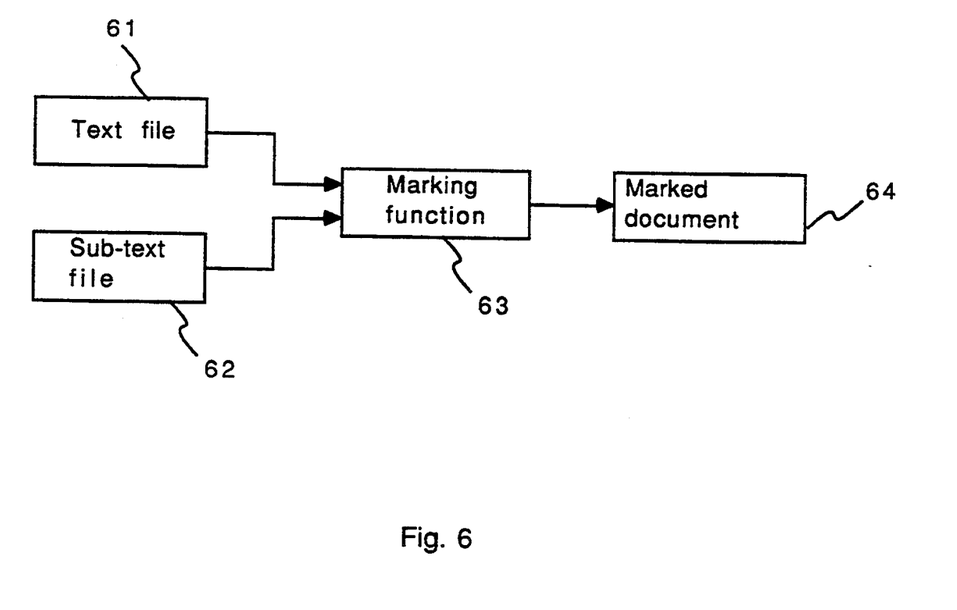
FIG. 6 is a schematic illustration of an embodiment of the invention adapted to encode a sub-text into the marking of a document.

In another embodiment of the invention, the basic marking scheme of the invention is used to encode a sub-text of arbitrary length within the spaces between words of a document. Such an embodiment is shown schematically in FIG. 6. Referring to FIG. 6, a marking function 63, as described in the context of the embodiment above, is applied to a text file 61 to produce a marked document 64, except that in this case the marking corresponds to the characters of sub-text file 62. Sub-text file 62 contains a message of arbitrary length which is encoded into the marked document, instead of individual short strings used in the marking string file 6 of FIG. 1. Using this or similar embodiments, the invention can be used to convey information within the spaces between words, at a density of approximately one character per ten words.

Another useful extension of the invention is its application to word-processing systems in which a plurality of users may have access to a document. One example of such an application is a multi-terminal word-processing system incorporating electronic mail facilities whereby a document can be circulated to a number of people in electronic form, that is, without printing on paper. Another example is a computer to which a number of users have access. In these and other cases, the invention can be used to deter those with access to the document from printing a copy and disclosing it to unauthorised persons. To achieve this, the invention can be adapted so that text files used by the word-processing system carry within them an indicator that the document which they represent is to be marked when printed, this indicator being accessible only to the author of the document.

The printing software of the data processing system is arranged so that if any person instructs that the document be printed, the document will be marked, for example with the name of the person requesting the print. The name can for convenience be automatically retrieved from a file containing a correspondence between the password of a user of the system and that user's name. Alternatively, the marking can be determined by a marking string designated by the original author of the document at the time it is electronically mailed to each person, the string and the indicator that the document is to be marked when printed being linked to the file when mailed.

While the invention has been described with reference to particular embodiments thereof, it will be understood by those skilled in the art that changes in the form and detail may be made without departing from the scope and spirit of the invention.

The marking process of the invention is independent of the nature of the document originating means and document printing means and it is anticipated that the invention can be realised in many ways other than those specifically mentioned herein. In particular, the invention can be realised as an integral part of a word-processing system, by adding suitable software to the word-processing software, or it can be realised as a stand-alone device interposed between a source of text data, such as a word processor, and a printer, or it can be realised as a printer adapted to carry out marking according to the invention.

It will also be understood that the scheme for relating a given marking code to a given sequence of inter-word space variations utilised by the embodiments described above are exemplary only and many other schemes, obvious to those skilled in the art, can be used without departing from the scope of the invention.

Furthermore, whereas the inventor believes that the spacing between words is the most suitable characteristic of a document to modify for the conveyance of the marking of the invention, it is envisaged that other characteristics of the formatting or visual presentation can be varied in like fashion without departing from the scope of the invention. For example, the spacing between letters can be varied as well as or instead of the spacing between words, or the typestyle or weight of individual characters or words can be varied according to the principle of the invention. It is also envisaged that in cases where it is desired to make it readily apparent that a document has been marked, one or more printing characters can be used instead of or as well as variations of spacing between words. For example, in the case of the embodiment described above in which two consecutive spaces are used to generate a long space, a space followed by an asterisk can be used, yielding a marked document similar in appearance to the example of FIG. 3.

A variety of other extensions of the invention are envisaged to accommodate special formatting requirements, such as right justification of text, in which case special care must be taken to ensure that the marking process does not adversely affect the appearance of the document. In the case of right justification specifically, some spaces between words can be shortened to ensure that the total line length remains unchanged.

It is further envisaged that whereas the embodiments described above utilise marking information provided by an operator, other adaptations of the invention can be provided whereby the marking codes can be automatically generated by the invention, for example by forming an ascending number sequence, or a sequence of random numbers, thereby assuring that each copy of a document is distinctively marked, without requiring the operator to provide specific marking information. In such cases it is desirable to maintain a set of duplicates of the documents before circulation for identification purposes. Other embodiments are possible in which the marking information is taken from a data field already serving another purpose within the memory of the data processing apparatus. For example the invention can be made to use the time and date information commonly resident in memory as the marking information, with the result that each copy of a marked document generated will be marked with the time and date at which the document was generated. Other fields such as the name of the author of the document, operator's password, or addressee's name can also be used in like manner.

Whereas the embodiments described herein refer to the document as being marked throughout its text, it is also possible to use the invention to mark only a selected portion of the text.

It will also be understood that whereas the exemplary embodiments described herein refer to the marking process taking place immediately prior to printing a document, the invention can also be beneficially applied for marking documents in electronic form, that is, documents in the form of files of data which may or may not be printed to form hard-copy at a later time.

INDUSTRIAL APPLICABILITY

The invention is particularly beneficial when used as part of a word-processing system, in which case the operator can request a number of copies of a confidential document to be printed, each being uniquely marked so as to identify the recipient. The invention provides a means for reducing the incidence of unauthorised distribution of confidential documents. The invention can also be used to provide marking of any computer-printed information, such as business reports. The invention also finds application in marking of documents to deter breach of copyright.

The invention is also useful for encoding messages within the formatting of a document. For example, using this invention, a book could be produced which conveys within the formatting of the words a sub-text which is only readable by those possessing the knowledge of the method of decoding the marking, while not detracting from the readability of the text.

I claim:

1. A method for document marking, comprising the steps of:
   a. obtaining a first text file representing a document;
   b. obtaining a marking code to be applied to said document;
   c. identifying each inter-word space in at least a portion of said first text file and changing each said space based on said marking code to generate a signal sequence having changed space lengths including at least first and second space lengths, said space length being a longer space than said second space length, and said second space length being a shorter space than said first space length; and
   d. producing a second text file representing a changed version of said document having changed space lengths.

2. A method of generating documents, according to claim 1 comprising the further step of repeating said steps b, c and d using, for each said repeating, a different marking code.

3. A method of generating documents according to claim 2 wherein said different marking codes are input as alpha-numeric strings.

4. A method of document marking according to claim 1 wherein said marking is indicative of an identity of a user accessing said first text file.

5. A method of generating documents, according to claim 1 comprising the further step of repeating said steps b, c and d using, for each said repeating, a different marking code, said different marking codes being stored in predetermined memory locations within said data processing system, said marking code including data representative of alpha-numeric strings.

6. A data processing system for generating documents, comprising:
   a. means for obtaining a code which will be used to mark a document;
   b. means for obtaining a first text file;
   c. means for generating a sequence of value based on said marking code;
   d. means for successively, for each inter-word space in at least a portion of said first text file, determining one of said values according to said sequence of values and changing each said space based on said value to generate space lengths including at least first and second space lengths, said first space length being a longer space than said second, space length; and
   e. means for producing a second text file representing a marked version of said document.

7. Means for generating documents, according to claim 6,
   wherein said obtaining code means generates a sequence of distinct marking codes; and
   said means d) includes means for generating third and subsequent marked text files, each said marked text file being marked using a different one of said distinct marking codes.

8. Means for generating documents according to claim 6, wherein said obtaining code means comprises
   a. means for generating a first marking code that is based on data stored in pre-determined memory locations within said data processing system, said memory locations containing data representative of alpha-numeric strings, said strings being representative of at least one of:
      a. a name of an author of a document,
      b. a number of a document indicating a number of times it has been revised,
      c. a current date and time,
      d. a name of a file in which the data representing the document is stored, and
      e. a name of an intended recipient of a document, who is to receive said document;
   b. means for changing said marking code each time the contents of said memory locations are changed; and
   c. means for generating third and subsequent marked versions of said document, each said marked version being marked using a different one of said marking codes.

9. Means for generating documents according to claim 6 and further comprising:
   a. means for receiving input of a sequence of alpha-numeric strings;
   b. means for forming a separate marking code corresponding to each of said alpha-numeric strings; and
   c. means for generating third and subsequent marked versions of said document, each said marked version being marked using a different one of said marking codes.

10. Apparatus according to claim 6, and further comprising:
   a. means for associating indicating data with said first text file data which indicates that said file is to be marked when printed;
   b. means for detecting whether said indicating data is associated with a document; and
   c. means for causing said means d to mark said document if said indicating data is present.

11. Document printer means comprising:
   a. text receiving means for receiving a data stream representative of a text of a document;
   b. marking code generating means for generating a marking code to be encoded into a document;
   c. controller means for forming information indicative of words to be printed including altering spaces between said words to printed, based on said generated marking code; and
   d. printing means for rendering a permanent image of the words as altered by said controller means.

12. Document printer means comprising:
   a. text receiving means for receiving a data stream representative of a text of a document;
   b. marking code receiving means for receiving data representative of a marking to be encoded into a document;
   c. controller means for altering spaces between words based on said received marking code; and
   d. printing means for rendering a permanent image of the text data altered by said controller means.

13. A marked document identifying method comprising the steps of:
   a. examining spacing between successive words of a document;
   b. classifying said spaces as being a first or second type, said first type being longer than said second type; and
   c. matching the resulting sequence of spaces with predetermined sequences said predetermined sequences representing alpha-numeric characters.

14. Marked document identifying means comprising:
   a. document scanning means;
   b. computing means for:
      i. receiving data from said scanning means;
      ii. measuring relative spacing between successive words of a document;
      iii. classifying said spaces as longer or shorter, and
      iv. correlating a sequence of longer and shorter spaces from said classifying operation with predetermined sequences, said sequences representing alpha-numeric characters; and
   c. means for outputting signals representative of said alpha-numeric characters.

15. A method of document marking comprising the steps of:
   a. obtaining a first text file representing a document;
   b. obtaining a marking code, which is uniquely representative of an object of marking, to be applied to said document;
   c. marking said document by modulating lengths of spaces between text elements in said first text file based on said marking code, in such a way that a visual presentation of said document is different from that of said first text file and said marking code can be recovered from only said lengths of spaces between said text elements; and
   d. producing a second text file representing a marked version of said document.

* * * * *